Figure 1:
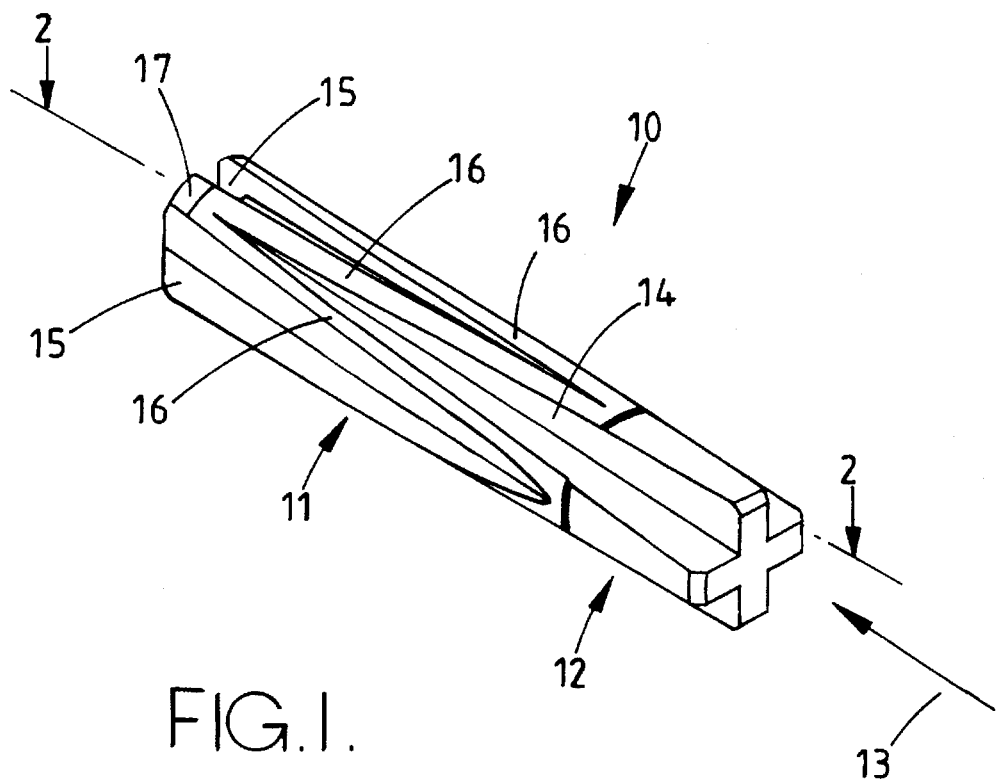

United States Patent

Cooke

Patent Number: 5,584,999
Date of Patent: Dec. 17, 1996

[54] EDGE FILTER WITH V-SHAPED CHANNELS

[75] Inventor: Michael P. Cooke, Gillingham, England

[73] Assignee: Lucas Industries Public limited company, West Midlands, England

[21] Appl. No.: 453,259

[22] Filed: May 30, 1995

Related U.S. Application Data

[62] Division of Ser. No. 209,453, Mar. 11, 1994, abandoned.

[30] Foreign Application Priority Data

Mar. 19, 1993 [GB] United Kingdom .................. 9305770

[51] Int. Cl.⁶ .................................................. B01D 29/44
[52] U.S. Cl. ..................... 210/439; 210/446; 210/459; 239/590.5
[58] Field of Search ...................... 123/299, 300, 123/460; 239/590, 590.3, 590.5, 533.1, 533.3, 533.13, 601, 533.2; 210/437, 438, 439, 446, 447, 459, 511

[56] References Cited

U.S. PATENT DOCUMENTS

| | | | |
|---|---|---|---|
| 1,500,986 | 7/1924 | Fish | 239/590.5 |
| 2,376,292 | 5/1945 | Tabb et al. | 239/533.7 |
| 2,731,299 | 1/1956 | Bramming | 239/590.5 |
| 3,486,700 | 12/1969 | Bristow | 239/590.5 |
| 4,312,479 | 1/1982 | Tolan . | |
| 4,346,849 | 8/1982 | Rood | 239/601 |
| 4,627,574 | 12/1986 | Hofmann . | |
| 5,273,216 | 12/1993 | Goulet et al. | 239/590.5 |

FOREIGN PATENT DOCUMENTS 0084182  6/1986  European Pat. Off. .

OTHER PUBLICATIONS

European Search Report dated Apr. 28, 1994 for EP 94/301663.

*Primary Examiner*—W. L. Walker
*Attorney, Agent, or Firm*—Trexler, Bushnell, Giangiorgi & Blackstone, Ltd.

[57] ABSTRACT

An edge filter for liquid has a filter body which is produced by a metal injection moulding process followed by a heat treatment process. The body which incorporates "V" section flow channels is then ground so as to establish when the filter body is in a bore, controlled clearances between the wall of the bore and ribs defined between adjacent flow channels.

4 Claims, 1 Drawing Sheet

U.S. Patent | Dec. 17, 1996 | 5,584,999

EDGE FILTER WITH V-SHAPED CHANNELS

This is a Divisional Application of application Ser. No. 08/209,453 filed on Mar. 11, 1994, now abandoned.

This invention relates to edge filters for liquids and to a method of making the same, the filters being of the kind comprising an elongated filter body which is located in a bore, an inlet and an outlet communicating with the opposite ends of the bore respectively, a first channel in the surface of the body, said first channel being open at one end of the body but closed at the other end thereof and a second channel in the surface of the body said second channel being open at the other end of the body but closed at the one end thereof, the surface of the body between said channels defining ribs, and said ribs having a controlled clearance with the surface of the bore whereby liquid supplied to said inlet will flow into one of said channels and will pass through the controlled clearances into the other channel to said outlet, solid contaminant in the liquid larger than the controlled clearances being retained in said one channel.

Such filters are widely used in the fuel injection nozzles of a fuel system for an internal combustion engine in particular, compression ignition engines. In such fuel systems the fuel has to flow through a plurality of outlet orifices in a nozzle body which may be as small as 0.14 mm and in order to ensure that the risk of blockage of the orifices is minimised, controlled clearances in the order of 30–45 microns have to be provided in the filter. Such small clearances constitute a restriction to the flow of fuel but the degree of restriction can be reduced by reducing the path length for the fuel as it flows across the ribs. The degree of restriction could be reduced by increasing the length of the body but such an approach is not possible due to the difficulty of finding room in the nozzle to accommodate an increased length of filter body.

The filter is located in a holder to which the nozzle body is secured and the aforesaid bore is part of the fuel inlet passage of the nozzle. In a typical example the filter body has a length of 20.0 mm and a diameter of 4.0 mm. In the past the flow channels have been formed by milling flats or slots in a length of suitable material to form the channels, heat treating the milled body to achieve a desired hardness value, and grinding the external surfaces of the body to achieve the controlled clearances with the wall of the bore. If the number of flow channels is increased the formation of the flats or slots by machining methods becomes more difficult and expensive and although increasing the diameter of the filter body would facilitate the machining operation again there would be a problem of accommodating the filter body in the nozzle.

The object of the present invention is to provide an edge filter body and a method of making the body, in a simple and convenient manner.

According to the invention an edge filter for liquids comprises an edge filter body which is located in a bore, the filter body having a plurality of first channels formed in its surface, the first channels being open at one end of the body but closed at the other end thereof, and a plurality of second channels which are open at the other end of the body but closed at the one end of the body the first and second channels being alternatively arranged about the body, the channels between them defining a plurality of ribs which have controlled clearances with the surface of the bore characterised in that said channels are of "V" section throughout their length and diminish in depth from their open ends to their closed ends whereby the ribs have substantially parallel side edges and are inclined relative to the axis of the body.

According to a further feature of the invention a method of making the body of an edge filter for liquids comprises metal injection moulding the body, heat treating the moulded blank so that the desired hardness value is achieved and grinding the blank to achieve the required controlled clearances between the ribs and the wall of the bore in which the finished body is located.

Figure 2:
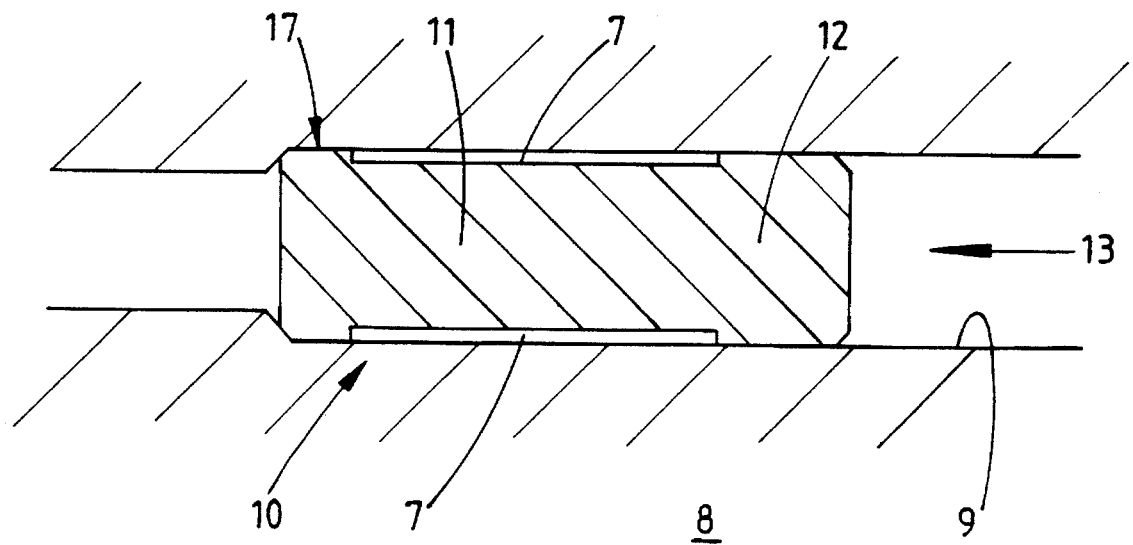

Examples of edge filter in accordance with the invention will now be described with reference to the accompanying drawings in which:

FIG. 1 is a perspective view of one example of a filter body produced in accordance with the invention, and FIG. 2 is a section on the line 2—2 of FIG. 1 showing the filter body in position in a bore.

Referring to the drawings there is illustrated a finished filter body 10 which is of elongated form and comprises a filter section 11 and an integral support section 12. The filter body is located in the fuel inlet passage 9 of a fuel injection nozzle 8 and the support section 12 is machined so that its external surfaces are an interference fit in the bore, the support section being located at the inlet end of the bore so that the flow of fuel is in the direction indicated by the arrow 13.

Considering the filter section 11 there is formed in the particular example, eight flow channels four of which, only one of which is illustrated at 14, extend from the inlet end of the filter towards but terminating short of the outlet end. The other four channels of which two are illustrated at 15, extend from the outlet end of the body but terminate short of the inlet end thereof. Each channel 14 and 15 is of "V" section of diminishing depth towards its closed end. Between adjacent channels 14 and 15 there is defined a rib 16 so that the body illustrated in FIG. 1 has eight such ribs. The edges of the ribs are substantially parallel throughout their length and because the channels diminish in depth towards their closed ends, the ribs are inclined relative to the axis of the body.

The channels 14 are extended through the support section 12 so that when the body is fitted in the bore fuel can flow into the portions of the channels 14 in the filter section 11.

The filter body as illustrated is formed from hardened metal and a blank is initially produced by a metal injection or by a powder moulding technique, the finished blank having the channels defined therein. Following the moulding operation the blank is hardened to the desired hardness using a suitable heat treatment process, and then a grinding operation is carried out. The surfaces of the ribs are machined so as to provide the desired controlled clearance with the wall of the bore and the portions of the support section intermediate the channels 14 are machined so as to form an interference fit with the wall of the bore. When the body 10 is inserted into the bore 9 the support section 12 being an interference fit with the bore retains the body within the bore. In order to centralise the body within the bore there may be provided at the outlet end of the body and on the portions of the body intermediate the channels 15 and beyond the closed ends of the channels 14, locating pads 17 which are a sliding fit with the wall of the bore. The pads centralise the outlet end of the body within the bore so as to assure the controlled clearances 7 between the surfaces of the ribs 16 and the wall of the bore.

In the use of the filter any contaminant which is retained in the channels 14, 14A tends to be broken down so that it will pass through the controlled clearances.

I claim:

1. An edge filter for liquids comprising an edge filter body which is located in a bore, the filter body having at least four first channels formed in its surface, the first channels being open at a first end of the body and closed at a second end thereof, and having at least four second channels which are open at the second end of the body and closed at the first end of the body, the first and second channels being alternately arranged about the body with said first channels being substantially equally spaced apart and said second channels being substantially equally spaced apart, the portions of said body between said first and second channels defining a plurality of ribs which have controlled clearances with the surface of the bore, each of said first and second channels being generally symmetrical, radially oriented and having two walls generally disposed to define a v-shaped section throughout their length and each of said first and second channels generally continuously tapering in depth from the open end thereof to the closed end thereof, whereby the ribs have substantially parallel side edges and are inclined relative to a central axis of the body.

2. An edge filter according to claim 1, in which one end portion of the body is formed as an interference fit with the wall of the bore.

3. An edge filter according to claim 2, including locating pads at the other end portion of the body, said pads being a sliding fit with the wall of the bore.

4. A filter body for use in a bore to filter liquids flowing between said filter body and an internal surface of said bore, said filter body defining a central axis, said filter body having a surface with four first channels and four second channels therein, each of said first and second channels being generally aligned with said central axis and being defined by two walls disposed at an angle, said walls defining a generally symmetrical, radially oriented v-shaped section, said first channels being open at a first end of said body and closed at a second end of said body, and said second channels being open at said second end of said body and closed at said first end of said body, each of said first and second channels generally continuously decreasing in depth from the respective open end to the respective closed end, said first and second channels being alternately arranged on said body, a plurality of ribs being defined between said first and second channels.

* * * * *